(12) United States Patent
Korth et al.

(10) Patent No.: US 8,242,193 B2
(45) Date of Patent: Aug. 14, 2012

(54) RUBBER MIXTURES

(75) Inventors: Karsten Korth, Grenzach-Wyhlen (DE);
Andre Hasse, Linnich (DE); Susann Witzsche, Rheinfelden (DE); Oliver Klockmann, Niederzier (DE); Philipp Albert, Lörrach (DE)

(73) Assignee: Evonik Degussa GmbH, Essen (DE)

( * ) Notice: Subject to any disclaimer, the term of this patent is extended or adjusted under 35 U.S.C. 154(b) by 1032 days.

(21) Appl. No.: 11/504,378

(22) Filed: Aug. 15, 2006

(65) Prior Publication Data
US 2007/0049669 A1 Mar. 1, 2007

(30) Foreign Application Priority Data

Aug. 17, 2005 (DE) .................. 10 2005 038 794

(51) Int. Cl.
*C08K 5/24* (2006.01)
*B60C 1/00* (2006.01)
*C08L 9/06* (2006.01)

(52) U.S. Cl. ........ 524/262; 524/261; 524/188; 524/609; 525/331.9; 152/209.1; 152/151

(58) Field of Classification Search .................. 524/262, 524/188, 261, 609, 269; 525/331.9; 152/209.1, 152/151
See application file for complete search history.

(56) References Cited

U.S. PATENT DOCUMENTS

| 3,997,581 | A | | 12/1976 | Pletka et al. |
| 4,002,594 | A | | 1/1977 | Fetterman |
| 4,048,206 | A | * | 9/1977 | Voronkov et al. ............. 556/405 |
| 6,378,582 | B1 | * | 4/2002 | Sandstrom et al. ........ 152/209.1 |
| 6,890,981 | B1 | * | 5/2005 | Luginsland .................... 524/262 |
| 2006/0060285 | A1 | * | 3/2006 | Weydert et al. ............... 152/905 |

FOREIGN PATENT DOCUMENTS

EP 0 919 558 A2 6/1999

OTHER PUBLICATIONS

Voronkov, M.G. et al., "1-(Thiocyanatoalkyl)Silatranes," J. Gen. Chem. USSR (EN), Jun. 1975, vol. 45, No. 6, p. 1366, Plenum Publishing Corporation, New York, NY.
European Search Report.

* cited by examiner

*Primary Examiner* — James J Seidleck
*Assistant Examiner* — Deve E Valdez
(74) *Attorney, Agent, or Firm* — Smith, Gambrell & Russell, LLP

(57) ABSTRACT

Rubber mixtures containing at least one rubber and an organosilicon compound of the general formula (I) $(Q\text{-})_k G\text{-}Si(\text{—O—}CX^1X^2\text{—}CX^1X^3\text{—})_3 N$. The rubber mixture is prepared by mixing at least one rubber and an organosilicon compound of the formula (I). The rubber mixtures can be used for the production of moldings.

15 Claims, No Drawings

RUBBER MIXTURES

INTRODUCTION AND BACKGROUND

The present invention relates to rubber mixtures, a process for their preparation and their use.

U.S. Pat. No. 4,048,206 discloses the synthesis of compounds of the general formula X'—Z'—Si(OR')$_3$N, where X' can be halogen or HS—, Z' can be a bivalent hydrocarbon and R' can be —CH$_2$—CH$_2$— or —CH(CH$_3$)—CH$_2$—.

Furthermore, the synthesis of NCS—CH$_2$—Si(O—CH$_2$—CH$_2$)$_3$N and NCS—CH$_2$—CH$_2$—CH$_2$—Si(O—CH$_2$—CH$_2$)$_3$N by transesterification of the corresponding methoxysilanes with triethanolamine with liberation of methanol is known from J. Gen. Chem. USSR (EN) 45(6), 1975, 1366 (Voronkov et al.).

EP 0 919 558 discloses silane derivatives of the formula R'''—Si(O—CR'R''—CR'R')$_3$N where at least one R'' is an alkenyloxyalkyl group. These silane derivatives can be used in silicone compounds.

The use of mercaptoalkyltrialkoxysilanes with silicate fillers in sulphur-crosslinked rubber blends is disclosed, inter alia, in U.S. Pat. No. 4,002,594.

A disadvantage of the known mercaptoalkyltrialkoxysilanes in sulphur-crosslinked rubber mixtures is the undesired premature reaction with the rubber during the mixing process, which complicates the processing owing to increasing viscosities of the mixture.

SUMMARY OF INVENTION

It is an object of the invention to prepare rubber mixtures having improved processability and better vulcanization properties.

The invention relates to rubber mixtures which are characterized in that they contain at least one rubber and at least one organosilicon compound of the general formula (I)

$$(Q\text{-})_k G\text{-Si}(-O-CX^1X^2-CX^1X^3-)_3N \quad (I)$$

where Q are identical or different and, independently of one another, are halogen, preferably chlorine, bromine or iodine, —SCN or —SH, k is 1 to 5, preferably 1 or 2, G is a straight-chain, cyclic or branched, substituted or unsubstituted, saturated or unsaturated di-, tri-, tetra- or pentavalent (C$_1$-C$_{24}$)—, preferably (C$_2$-C$_{24}$)—, particularly preferably (C$_3$-C$_{20}$)—, very particularly preferably (C$_4$-C$_{18}$)—, extremely preferably (C$_5$-C$_{18}$)—, hydrocarbon chain, and the hydrocarbon chains can optionally also contain alkylaromatics (aralkyl) or aromatics or can be substituted therewith, and the substituted hydrocarbon chains can preferably be substituted by halogen, for example Cl or Br, —COOR or HS—, X$^1$, X$^2$ and X$^3$, in each case independently of one another, denote hydrogen (—H), straight-chain unsubstituted or branched unsubstituted (C$_1$-C$_{16}$)-alkyl, preferably straight-chain unsubstituted or branched unsubstituted (C$^1$-C$_8$)-alkyl, particularly preferably methyl or ethyl, or an aryl group, preferably phenyl.

The rubber can preferably be a diene rubber, which has a meaning well known in the art.

For k equal to 1, G-Si can preferably be —CH$_2$—Si, —CH$_2$CH$_2$Si, —CH$_2$CH$_2$CH$_2$—Si, —CH$_2$CH$_2$CH$_2$CH$_2$—Si, —CH(CH$_3$)—Si, —CH$_2$CH(CH$_3$)—Si, —CH(CH$_3$)CH$_2$—Si, —C(CH$_3$)$_2$—Si, —CH(C$_2$H$_5$)—Si, —CH$_2$CH$_2$CH(CH$_3$)—Si, —CH(CH$_3$)—CH$_2$CH$_2$—Si, —CH$_2$CH(CH$_3$)CH$_2$—Si, —CH$_2$—C$_6$H$_4$—CH$_2$—Si, —CH$_2$—C$_6$H$_4$—CH$_2$—CH$_2$—Si or —CH$_2$—CH$_2$—C$_6$H$_4$—CH$_2$—CH$_2$—Si.

For k equal to 2, G-Si can preferably be —CH(-)—Si, —CH$_2$—CH(-)—Si, —CH$_2$—CH(-)-CH$_2$—Si, —CH$_2$—CH(-)-CH$_2$CH$_2$—Si, —CH$_2$C(-)(CH$_3$)—Si, —CH(CH$_3$)CH(-)—Si, —CH$_2$—CH(-)-CH(CH$_3$)—Si, —CH(CH$_3$)—CH(-)-CH$_2$—Si, —CH$_2$—C(CH$_3$)(-)-CH$_2$—Si or —CH$_2$—CH(-)-C$_6$H$_4$—CH$_2$—CH$_2$—Si.

Organosilicon compounds of the general formula (I) can be mixtures of organosilicon compounds of the general formula (I).

Organosilicon compounds of the general formula (I) can be partly hydrolysed compounds of organosilicon compounds of the general formula (I).

Organosilicon compounds of the general formula (I) where k is equal to 1 can be:

Cl—CH$_2$—Si(—O—CH$_2$—CH$_2$—)$_3$N,

Cl—CH$_2$—CH$_2$—Si(—O—CH$_2$—CH$_2$—)$_3$N,

Cl—CH$_2$—CH$_2$—CH$_2$—Si(—O—CH$_2$—CH$_2$—)$_3$N,

Cl—CH$_2$—CH(CH$_3$)—CH$_2$—Si(—O—CH$_2$—CH$_2$—)$_3$N,

Cl—CH$_2$—Si(—O—CH(CH$_3$)—CH$_2$—)$_3$N,

Cl—CH$_2$—CH$_2$—Si(—O—CH(CH$_3$)—CH$_2$—)$_3$N,

Cl—CH$_2$—CH$_2$—CH$_2$—Si(—O—CH(CH$_3$)—CH$_2$—)$_3$N,

Cl—CH$_2$—CH(CH$_3$)—CH$_2$—Si(—O—CH(CH$_3$)—CH$_2$—)$_3$N,

Br—CH$_2$—Si(—O—CH$_2$—CH$_2$—)$_3$N,

Br—CH$_2$—CH$_2$—Si('O—CH$_2$—CH$_2$—)$_3$N,

Br—CH$_2$—CH$_2$—CH$_2$—Si(—O—CH$_2$—CH$_2$—)$_3$N,

Br—CH$_2$—CH(CH3)—CH$_2$—Si(—O—CH$_2$—CH$_2$—)$_3$N,

Br—CH$_2$—Si(—O—CH(CH$_3$)—CH$_2$—)$_3$N,

Br—CH$_2$—CH$_2$—Si(—O—CH(CH$_3$)—CH$_2$—)$_3$N,

Br—CH$_2$—CH$_2$'CH$_2$—Si(—O—CH(CH$_3$)—CH$_2$—)$_3$N,

Br—CH$_2$—CH(CH$_3$)'CH$_2$—Si(—O—CH(CH$_3$)—CH$_2$—)$_3$N,

I—CH$_2$—Si(—O—CH$_2$—CH$_2$—)$_3$N,

I—CH$_2$—CH$_2$—Si(—O—CH$_2$—CH$_2$—)$_3$N,

I—CH$_2$—CH$_2$—CH$_2$—Si(—O—CH$_2$—CH$_2$—)$_3$N,

I—CH$_2$—CH(CH$_3$)—CH$_2$—Si(—O—CH$_2$—CH$_2$—)$_3$N,

I—CH$_2$—Si(—O—CH(CH$_3$)—CH$_2$—)$_3$N,

I—CH$_2$—CH$_2$—Si(—O—CH(CH$_3$)—CH$_2$—)$_3$N,

I—CH$_2$—CH$_2$—CH$_2$—Si(—O—CH(CH$_3$)—CH$_2$—)$_3$N,

I—CH$_2$—CH(CH$_3$)—CH$_2$—Si(—O—CH(CH$_3$)—CH$_2$—)$_3$N,

NCS—CH₂—Si(—O—CH₂—CH₂—)₃N,

NCS—CH₂—CH₂—Si(—O—CH₂—CH₂—)₃N,

NCS—CH₂—CH₂—CH₂—Si(—O—CH₂—CH₂—)₃N,

NCS—CH₂—CH(CH₃)—CH₂—Si(—O—CH₂—CH₂—)₃N,

NCS—CH₂—Si(—O—CH(CH₃)—CH₂—)₃N,

NCS—CH₂—CH₂—Si(—O—CH(CH₃)—CH₂—)₃N,

NCS—CH₂—CH₂—CH₂—Si(—O—CH(CH₃)—CH₂—)₃N,

NCS—CH₂—CH(CH₃)—CH₂—Si(—O—CH(CH₃)—CH₂—)₃N,

HS—CH₂—Si(—O—CH₂—CH₂—)₃N,

HS—CH₂—CH₂—Si(—O'CH₂—CH₂—)₃N,

HS—CH₂—CH₂—CH₂—Si(—O—CH₂—CH₂—)₃N,

HS—CH₂—CH(CH₃)—CH₂—Si(—O—CH₂—CH₂—)3N,

HS—CH₂—Si(—O—CH(CH₃)—CH₂—)₃N,

HS—CH₂—CH₂—Si(—O—CH(CH₃)—CH₂—)₃N,

HS—CH₂—CH₂—CH₂—Si(—O—CH(CH₃)—CH₂—)₃N or

HS—CH₂—CH(CH₃)—CH₂—Si(—O—CH(CH₃)—CH₂—)₃N.

Organosilicon compounds of the general formula (I) where k is equal to 2 can be:

Cl—CH₂—CH(Cl)—Si(—O—CH₂—CH₂—)₃N,

Cl—CH₂—CH(Cl)—CH₂—Si(—O—CH₂—CH₂—)₃N,

Cl—CH₂—C(Cl)(CH₃)—CH₂—Si(—O—CH₂—CH₂—)₃N,

Cl—CH₂—CH(Cl)—Si(—O—CH(CH₃)—CH₂—)₃N,

Cl—CH₂—CH(Cl)—Si(—O—CH(CH₃)—CH₂—)₃N,

Cl—CH₂—C(Cl)(CH₃)—CH₂—Si(—O—CH(CH₃)—CH₂—)₃N,

Br—CH₂—CH(Br)—Si(—O—CH₂—CH₂—)₃N,

Br—CH₂—CH(Br)—CH₂—Si(—O—CH₂—CH₂—)₃N,

Br—CH₂—C(Br)(CH₃)—CH₂—Si(—O—CH₂—CH₂—)₃N,

Br—CH₂—CH(Br)—Si(—O—CH(CH₃)—CH₂—)₃N,

Br—CH₂—CH(Br)—Si(—O—CH(CH₃)—CH₂—)₃N,

Br—CH₂—C(Br)(CH₃)—CH₂—Si(—O—CH(CH₃)—CH₂—)₃N,

I—CH₂—CH(I)—Si(—O—CH₂—CH₂—)₃N,

I—CH₂—CH(I)—CH₂—Si(—O—CH₂—CH₂—)₃N,

I—CH₂—C(I)(CH₃)—CH₂—Si(—O—CH₂—CH₂—)₃N,

I—CH₂—CH(I)—Si(—O—CH(CH₃)—CH₂—)₃N,

I—CH₂—CH(I)—Si(—O—CH(CH₃)—CH₂—)₃N,

I—CH₂—C(I)(CH₃)—CH₂—Si(—O—CH(CH₃)—CH₂—)₃N,

NCS—CH₂—CH(SCN)—Si(—O—CH₂—CH₂—)₃N,

NCS—CH₂—CH(SCN)—CH₂—Si(—O—CH₂—CH₂—)₃N,

NCS—CH₂—C(SCN)(CH₃)—CH₂—Si(—O—CH₂—CH₂—)₃N,

NCS—CH₂—CH(SCN)—Si(—O—CH(CH₃)—CH₂—)₃N,

NCS—CH₂—CH(SCN)—Si(—O—CH(CH₃)—CH₂—)₃N,

NCS—CH₂—C(SCN)(CH₃)—CH₂—Si(—O—CH(CH₃)—CH₂—)₃N,

HS—CH₂—CH(SH)—Si(—O—CH₂—CH₂—)₃N,

HS—CH₂—CH(SH)—CH₂—Si(—O—CH₂—CH₂—)₃N,

HS—CH₂—C(SH)(CH₃)—CH₂—Si(—O—CH₂—CH₂—)₃N,

HS—CH₂—CH(SH)—Si(—O—CH(CH₃)—CH₂—)₃N,

HS—CH₂—CH(SH)—Si(—O—CH(CH₃)—CH₂—)₃N or

HS—CH₂—C(SH)(CH₃)—CH₂—Si(—O—CH(CH₃)—CH₂—)₃N.

DETAILED DESCRIPTION OF INVENTION

The organosilicon compounds of the formula (I) can be prepared by reacting at least one compound of the general formula (II)

(Q-)$_k$G-Si(—O-Alk)₃     (II)

where G, Q and k have the abovementioned meanings and Alk, independently of one another, are (C₁-C₂₄)-alkyl, preferably methyl, ethyl or propyl, with compounds of the general formula III

(HO—CX¹X²—CX¹X³—)₃N     (III)

where X¹, X², and X³ have the abovementioned meanings, with elimination of Alk-OH, and separating Alk-OH from the reaction mixture.

The reaction can be carried out with catalysis or without catalysis. The Alk-OH can be separated from the reaction mixture continuously or batchwise.

Examples of compounds of the general formula III can be: triethanolamine, triisopropanolamine and [HO—CH(phenyl)CH₂]₃N.

A low water content of the compounds of the formula III which are used can have an advantageous effect on the composition and the product properties of the compounds. The compounds of the formula III can preferably have a water content of less than 1% by weight, particularly preferably of less than 0.5% by weight, very particularly preferably of less than 0.3% by weight, extremely preferably of less than 0.2% by weight.

The reaction can be carried out in typical organic solvents having a boiling point of less than 200° C., preferably less than 160° C., particularly preferably less than 130° C., very particularly preferably less than 100° C.

The reaction can be carried out in the presence of organic solvents having a boiling point of less than 220° C., preferably less than 180° C., particularly preferably less than 150° C., very particularly preferably less than 120° C.

The reaction can be carried out in the absence of organic solvents.

The reaction can be carried out in a manner such that at least one starting compound is in the melt, solution or suspension.

The reaction can be carried out in a manner such that at least one reaction product is in the melt, solution or suspension.

The reaction in the absence of organic solvents can be preferable to reactions in solvents, owing to the higher yield achieved.

The reaction in the absence of organic solvents can be preferable to reactions in solvents, owing to the higher purity of the products which is achieved.

The reaction in the absence of organic solvents can be preferable owing to the absence of traces of solvent in the products.

The reaction in the absence of organic solvents can be preferable owing to the minimization of volatile compounds (volatile organic compounds=VOC) in the products obtained.

The reaction in the absence of organic solvents can be preferable to the reaction in organic solvents because a drying step in the process for removing traces of solvent is dispensed with.

Metal-free or metal-containing catalysts can be used as a catalyst in the process for the preparation of organosilicon compounds of the formula (I).

Metal compounds of the 3rd-7th group, of the 13th-14th group and/or of the lanthanide group can be used as metal-containing catalysts.

Transition metal compounds can be used as metal-containing catalysts.

The metal-containing catalysts can be metal compounds, such as, for example, metal chlorides, metal oxides, metal oxychlorides, metal sulphides, metal sulphochlorides, metal alcoholates, metal thiolates, metal oxyalcoholates, metal amides, metal imides or transition metal compounds having multiple bonded ligands.

For example, halides, amides or alcoholates of the 3rd main group ($M^{3+}$=B,Al,Ga,In,Tl: $M^{3+}(OMe)_3$, $M^{3+}(OEt)_3$, $M^{3+}(OC_3H_7)_3$, $M^{3+}(OC_4H_9)_3$), halides, oxides, sulphides, imides, alcoholates, amides, thiolates and combinations of said classes of substituents having multiply bonded ligands to compounds of the lanthanide group (rare earth metals, atomic number 58 to 71 in the Periodic Table of the Elements), halides, oxides, sulphides, imides, alcoholates, amides, thiolates and combinations of said classes of substituents having multiply bonded ligands to compounds of the 3rd subgroup ($M^{3+}$=Sc,Y,La: $M^{3+}(OMe)_3$, $M^{3+}(OEt)_3$, $M^{3+}(OC_3H_7)_3$, $M^{3+}(OC_4H_9)_3$, $cpM^{3+}(Cl)^2$, cp $cpM^{3+}(OMe)_2$, $cpM^{3+}(OEt)_2$, $cpM^{3+}(NMe_2)_2$ with cp=cyclopentadienyl), halides, sulphides, amides, thiolates or alcoholates of the 4th main group ($M^{4+}$=Si,Ge,Sn,Pb: $M^{4+}(OMe)_4$, $M^{4+}(OEt)_4$, $M^{4+}(OC_3H_7)_4$, $M^{4+}(OC_4H_9)_4$; $M^{2+}$=Sn,Pb: $M^{2+}(OMe)_2$, $M_{2+}(OEt)_2$, $M_{2+}(OC_3H_7)_2$, $M_{2+}(OC_4H_9)_2$), tin dilaurate, tin diacetate, $Sn(OBu)_2$, halides, oxides, sulphides, imides, alcoholates, amides, thiolates and combinations of said classes of substituents having multiply bonded ligands to compounds of the 4th subgroup ($M^{4+}$=Ti,Zr,Hf: $M^{4+}(F)_4$, $M^{4+}(Cl)_4$, $M^{4+}(Br)_4$, $M^{4+}(I)_4$, $M^{4+}(OMe)_4$, $M^{4+}(OEt)_4$, $M^{4+}(OC_3H_7)_4$, $M^{4+}(OC_4H_9)_4$, $cp_2Ti(Cl)_2$, $cp_2Zr(Cl)_2$, $cp_2Hf(Cl)_2$, $cp_2Ti(OMe)_2$, $cp_2Zr(OMe)_2$, $cp_2Hf(OMe)_2$, $cpTi(Cl)_3$, $cpZr(Cl)_3$, $cpHf(Cl)_3$, $cpTi(OMe)_3$, $cpZr(OMe)_3$, $cpHf(OMe)_3$, $M^{4+}(NMe_2)_4$, $M^{4+}(NEt_2)_4$, $M^{4+}(NHC_4H_9)_4$), halides, oxides, sulphides, imides, alcoholates, amides, thiolates and combinations of said classes of substituents having multiply bonded ligands to compounds of the 5th subgroup ($M^{5+}$, $M^{4+}$ or $M^{3+}$=V,Nb,Ta: $M^{5+}(OMe)_5$, $M^{5+}(OEt)_5$, $M^{5+}(OC_3H_7)_5$, $M^{5+}(OC_4H_9)_5$, $M^{3+}O(OMe)_3$, $M^{3+}O(OEt)_3$, $M^{3+}O(OC_3H_7)_3$, $M_{3+}O(OC_4H_9)_3$, $cpV(OMe)_4$, $cpNb(OMe)_3$, $cpTa(OMe)_3$, $cpV(OMe)_2$, $cpNb(OMe)_3$, $cpTa(OMe)_3$), halides, oxides, sulphides, imides, alcoholates, amides, thiolates and combinations of said classes of substituents having multiply bonded ligands to compounds of the 6th subgroup ($M^{6+}$, $M^{5+}$ or $M^{4+}$=Cr,Mo,W: $M^{6+}(OMe)_6$, $M^{6+}(OEt)_6$, $M^{6+}(OC_3H_7)_6$, $M^{6+}(OC_4H_9)_6$, $M^{6+}O(OMe)_4$, $M^{6+}O(OEt)_4$, $M^{6+}O(OC_3H_7)_4$, $M^{6+}O(OC_4H_9)_4$, $M^{6+}O_2(OMe)_2$, $M^{6+}O_2(OEt)_2$, $M^{6+}O_2(OC_3H_7)_2$, $M^{6+}O_2(OC_4H_9)_2$, $M^{6+}O_2(OSiMe_3)_2$) or halides, oxides, sulphides, imides, alcoholates, amides, thiolates and combinations of said classes of substituents having multiply bonded ligands to compounds of the 7th subgroup ($M_{7+}$, $M^{6+}$, $M^{5+}$ or $M^{4+}$=Mn,Re: $M^{7+}O(OMe)_5$, $M^{7+}M^{7+}O(OEt)_5$, $M^{7+}O(OC_3H_7)_5$, $M^{7+}O(OC_4H_9)_5$, $M^{7+}O_2(OMe)_3$, $M^{7+}O_2(OEt)_3$, $M_{7+}O_2(OC_3H_7)_3$, $M^{7+}O_2(OC_4H_9)_3$, $M^{7+}O_2(OSiMe_3)_3$, $M^{7+}O_3(OSiMe_3)$, $M^{7+}O_3(CH_3)$) can be used as metal compounds.

The metal and transition metal compounds can have a free coordination site on the metal.

Metal or transition metal compounds which are formed by addition of water to hydrolysable metal or transition metal compounds can also be used as catalysts.

For example, titanium alkoxides can be used as metal-containing catalysts.

In particular, titanates, such as, for example, tetra-n-butyl-orthotitanate, tetraethyl orthotitanate, tetra-n-propyl orthotitanate or tetraisopropyl orthotitanate, can be used as catalysts.

Organic acids can be used as metal-free catalysts.

For example, trifluoroacetic acid, trifluoromethanesulphonic acid or p-toluenesulphonic acid, trialkylammonium compounds $R_3NH^+X^-$ or organic bases, such as, for example, trialkylamines $NR_3$, can be used as organic acids.

The preparation process can be carried out at atmospheric pressure or reduced pressure, preferably from 1 to 600 mbar, particularly preferably from 5 to 400 mbar, very particularly preferably from 5 to 200 mbar.

The preparation process can be carried out in the temperature range between 50° C. and 200° C., preferably between 70° C. and 180° C., particularly preferably between 90° C. and 150° C.

Substances which promote the transport of water from the product via formation of azeotropic mixtures can be added to the reaction mixture before or during the reaction. The corresponding substances can be cyclic or straight-chain aliphatics, aromatics, mixed aromatic-aliphatic compounds, ethers, alcohols or acids. For example, hexane, cyclohexane, benzene, toluene, ethanol, propanol, isopropanol, butanol, ethylene glycol, tetrahydrofuran, dioxane, formic acid, acetic acid, ethyl acetate or dimethylformamide can be used.

The reaction can be carried out continuously or batchwise.

In the preparation process, additives can be added to the reaction mixture before, during or after the reaction. The additives can preferably be added before the reaction.

In order to avoid condensation reactions, it can be advantageous to carry out the reaction in an anhydrous environment, ideally in an inert gas atmosphere.

The organosilicon compounds of the formula (I) can be used as adhesion promoters between inorganic materials, for example glass fibres, metals, oxidic fillers or silicas, and organic polymers, for example thermosetting plastics, thermoplastics or elastomers, or as crosslinking agents and surface modifiers. The organosilicon compounds of the formula (I) can be used as coupling reagents in filled rubber mixtures, for example tyre treads.

The organosilicon compounds of the general formula (I) can be used in amounts of 0.1 to 50% by weight, preferably 0.1 to 25% by weight, particularly preferably 1 to 20% by weight, based on the amount of the rubber used.

The invention furthermore relates to a process for the preparation of the rubber mixtures according to the invention, which is characterized in that at least one rubber and an organosilicon compound of the formula (I) are mixed.

The rubber mixture can contain at least one filler.

The addition of the organosilicon compounds of the general formula (I) and the addition of the fillers can be effected at material temperatures of 100 to 200° C. However, it can also be effected at lower temperatures of 40 to 100° C., for example together with further rubber auxiliaries.

The organosilicon compounds of the formula (I) can be added to the mixing process both in pure form and after application to an inert organic or inorganic substrate, and in a form pre-reacted with an organic or inorganic substrate. Preferred substrate materials can be precipitated or pyrogenic silicas, waxes, thermoplastics, natural or synthetic silicates, natural or synthetic oxides, preferably alumina, or carbon blacks. Furthermore, the organosilicon compounds can also be added to the mixing process in a form pre-reacted with the filler to be used.

The organosilicon compounds of the formula (I) can be physically mixed with an organic substance or with a mixture of organic substances before being added to the mixing process. The organic substance or the mixture of organic substances can contain polymers or oligomers. The polymers or oligomers can be heteroatom-containing polymers or oligomers, for example ethylene vinyl alcohol, ethylene vinyl acetate, polyvinyl acetate and/or polyvinyl alcohols. Polymers or oligomers can be saturated or unsaturated elastomers, preferably emulsion SBR and/or solution SBR. The melting point of the mixture of organosilicon compounds and organic substance or a mixture of organic substances can be between 50 and 200° C., preferably between 70 and 180° C., particularly preferably between 70 and 150° C., very particularly preferably between 70 and 130° C., extremely preferably between 90 and 110° C. The organic substance or the mixture of organic substances can contain at least one olefinic wax and/or long-chain carboxylic acids.

The following fillers can be used as fillers for the rubber mixtures according to the invention:

Carbon blacks: the carbon blacks to be used here can be prepared by the flame black, furnace, gas black or thermal black process. The carbon blacks can have a BET surface area of 20 to 200 m$^2$/g. The carbon blacks can optionally also be doped, such as, for example, with Si.

Amorphous silicas, prepared, for example, by precipitation from solutions of silicates (precipitated silicas) or flame-hydrolysis of silicon halides (pyrogenic silicas). The amorphous silicas can have a specific surface area of 5 to 1000 m$^2$/g, preferably 20 to 400 m$^2$/g (BET surface area) and a primary particle size of 10 to 400 nm. The silicas can optionally also be present as mixed oxides with other metal oxides, such as Al, Mg, Ca, Ba, Zn and titanium oxides.

Synthetic silicates, such as aluminium silicate or alkaline earth metal silicates, for example magnesium silicate or calcium silicate. The synthetic silicates having BET surface areas of 20 to 400 m$^2$/g and primary particle diameters of 10 to 400 nm.

Synthetic or natural aluminas and aluminium hydroxides.

Natural silicates, such as kaolin and other naturally occurring silicas.

Glass fibres and glass fibre products (mats, strands) or glass microspheres.

Amorphous silicas prepared by precipitation of solutions of silicates (precipitated silicas), having BET surface areas of 20 to 400 m$^2$/g, in amounts of 5 to 150 parts by weight, based in each case on 100 parts of rubber, can preferably be used.

The above described fillers can be used alone or as a mixture. In a particularly preferred version of the process, 10 to 150 parts by weight of light fillers, optionally together with 0 to 100 parts by weight of carbon black, and 1 to 20 parts by weight of a compound of the organosilicon compounds, based in each case on 100 parts by weight of rubber, can be used for the preparation of the mixtures.

For the preparation of the rubber mixtures according to the invention, synthetic rubbers are also suitable in addition to natural rubber. Preferred synthetic rubbers are described, for example, in W. Hofmann, Kautschuktechnologie [Rubber technology], Genter Verlag, Stuttgart 1980. They comprise, inter alia, polybutadiene (BR), polyisoprene (IR), styrene/butadiene copolymers, for example emulsion SBR (E-SBR) or solution SBR (L-SBR), preferably having a styrene content of 1 to 60% by weight, particularly preferably 2 to 50% by weight, based on the total polymer, chloroprene (CR), isobutylene/isoprene copolymers (IIR), butadiene/acrylonitrile copolymers, preferably having an acrylonitrile content of 5 to 60% by weight, preferably 10 to 50% by weight, based on the total polymer (NBR), partly hydrogenated or completely hydrogenated NBR rubber (HNBR), ethylene/propylene/diene copolymers (EPDM) or abovementioned rubbers which additionally have functional groups, such as, for example, carboxyl, silanol or epoxy groups, for example epoxidized NR, carboxy-functionalized NBR or silanol-(SiOH) or silyloxy-functionalized (—Si—OR) SBR, and blends of these rubbers. For production of vehicle tire treads, anionically polymerized S—SBR rubbers (solution SBR) having a glass transition temperature above −50° C. and blends thereof with diene rubbers are of particular interest.

The rubber vulcanisates according to the invention can contain further rubber auxiliaries, such as reaction accelerators, anti-ageing agents, heat stabilizers, light stabilizers, antiozonants, processing auxiliaries, plasticizers, tackifiers, blowing agents, dyes, pigments, waxes, extenders, organic acids, retardants, metal oxides and activators, such as diphenylguanidine, triethanolamine, polyethylene glycol, alkoxy-terminated polyethylene glycol alkyl-O—(CH$_2$—CH$_2$—O)$_{y^1}$—H where $y^1$=2-25, preferably $y^1$=2-15, particularly preferably $y^1$=3-10, very particularly preferably $y^1$=3-6, or hexanetriol, which are known to the rubber industry.

The vulcanization of the rubber mixtures according to the invention can be carried out without addition of nitrogen-containing activators, such as, for example, guanidines and amines. In a preferred embodiment, the rubber vulcanisate can be free of guanidine derivatives.

The rubber auxiliaries can be used in known amounts which depend, inter alia, on the intended use. Customary amounts can be, for example, amounts of 0.1 to 50% by weight, based on rubber. Sulphur or sulphur-donating substances can be used as crosslinking agents. The rubber mixtures according to the invention can additionally contain vulcanization accelerators. Examples of suitable vulcanization accelerators can be mercaptobenzothiazoles, sulphenamides, guanidines, thiurams, dithiocarbamates, thioureas and thiocarbonates. The vulcanization accelerators and sulphur can be used in amounts of 0.1 to 10% by weight, preferably 0.1 to 5% by weight, based on rubber.

The vulcanization of the rubber mixtures according to the invention can be effected at temperatures of 100 to 200° C., preferably 130 to 180° C., optionally under pressure of 10 to 200 bar. The mixing of the rubbers with the filler, optionally rubber auxiliaries and the organosilicon compounds can be carried out in known mixing units, such as roll mills, internal mixers and mixer extruders.

The rubber mixtures according to the invention can be used for the production of mouldings, for example for the production of pneumatic tires, tire treads, cable sheaths, hoses, drive belts, conveyer belts, roll coverings, tires, shoe soles, gaskets and damping elements.

The rubber mixtures according to the invention have the advantage that they have improved processability and better vulcanization properties than the known mercaptoalkyltrialkoxysilanes.

EXAMPLES

Example 1

Preparation of HS—$CH_2$—$CH_2$—$CH_2$—Si(O—$CH_2$—$CH_2$)$_3$N (based on J. Gen. Chem. USSR (EN), 45, 1975, 1618)

The HS—$CH_2$—$CH_2$—$CH_2$—Si(O—$CH_2$—$CH_2$)$_3$N is synthesized from commercially available HS—$CH_2$—$CH_2$—$CH_2$—Si(O—$CH_2$—$CH_3$)$_3$ with an equimolar amount of triethanolamine in the presence of Ti(OBu)$_4$ at 110-140° C. under reduced pressure in the course of 180-360 min by transesterification in the absence of a solvent. The ethanol formed is distilled off.

Example 2

Preparation of Cl—$CH_2$—$CH_2$—$CH_2$—Si(O—$CH_2$—$CH_2$)$_3$N (based on J. Gen. Chem. USSR (EN), 45, 1975, 1618)

The Cl—CH2-CH2-CH2—Si(O—CH2-CH2)3N is synthesized from commercially available Cl—$CH_2$—$CH_2$—$CH_2$—Si(O—$CH_2$—$CH_3$)$_3$ with an equimolar amount of triethanolamine in the presence of Ti(OBu)$_4$ at 120-160° C. under reduced pressure in the course of 180-360 min by transesterification in the absence of a solvent. The ethanol formed is distilled off.

Example 3

Rubber Technology Investigations

The formulation used for the rubber mixtures is shown in table 1 below. There, the unit phr means proportions by weight, based on 100 parts of the raw rubber used. The organosilicon compounds are used in equimolar amounts, i.e. with the same amount of substance.

The following coupling agents are investigated:

In mixture 1: mercaptopropyltriethoxysilane, VP Si 263 from Degussa AG (comparative example)

In mixture 2: organosilicon compound according to example 1

The general process for the preparation of rubber mixtures and vulcanizates thereof is described in the book: "Rubber Technology Handbook", W. Hofmann, Hanser Verlag 1994.

TABLE 1

|  | Mixture 1 Mercaptopropyl-triethoxysilane [phr] | Mixture 2 Organosilicon compound according to ex. 1 [phr] |
|---|---|---|
| 1$^{st}$ stage | | |
| Buna VSL 5025-1 | 96 | 96 |
| Buna CB 24 | 30 | 30 |
| Ultrasil 7000 GR | 80 | 80 |
| Organosilicon compound | 2.4 | 2.51 |
| ZnO | 3 | 3 |
| Stearic acid | 2 | 2 |
| Naftolen ZD | 10 | 10 |
| Vulkanox 4020 | 1.5 | 1.5 |
| Protektor G 3108 | 1 | 1 |
| 2$^{nd}$ stage | | |
| Batch stage 1 | | |
| 3rd stage | | |
| Batch stage 2 | | |
| Vulkacit D | 2 | 2 |
| Vulkacit CZ | 1.5 | 1.5 |
| Perkacit TBzTD | 0.2 | 0.2 |
| Sulphur | 2.2 | 2.2 |

The polymer VSL 5025-1 is a solution-polymerized SBR copolymer from Bayer AG, having a styrene content of 25% by weight and a butadiene content of 75% by weight. The copolymer contains 37.5 phr of oil and has a Mooney viscosity (ML 1+4/100° C.) of 50.

The polymer Buna CB 24 is a cis-1,4-polybutadiene (neodymium type) from Bayer AG, having a cis-1,4 content of at least 96% and a Mooney viscosity of 44±5.

Ultrasil 7000 GR is a readily dispersible silica from Degussa AG and has a BET surface area of 170 m$^2$/g.

Naftolen ZD from Chemetall is used as an aromatic oil, Vulkanox 4020 is PPD from Bayer AG and Protektor G3108 is an antiozonant wax from Paramelt B.V. Vulkacit CZ (CBS) and Vulkacit D (DPG) are commercial products from Bayer AG. Perkacit TBzTD (tetrabenzylthiuram tetrasulphide) is a product from Flexsys N.V.

The rubber mixtures are prepared in an internal mixer according to the mixing method in table 2.

TABLE 2

| Stage 1 | |
|---|---|
| Settings | |
| Mixing unit | Werner & Pfleiderer E type |
| Speed | 60 min$^{-1}$ |
| RAM pressure | 5.5 bar |
| MT volume | 1.58 L |
| Degree of filling | 0.56 |
| Flow-through temp. | 70° C. |

TABLE 2-continued

Mixing process

| | |
|---|---|
| 0 to 1 min | Buna VSL 5025-1 + Buna CB 24 |
| 1 to 2 min | ½ silica, ZnO, stearic acid, Naftolen ZD, coupling agent |
| 2 to 4 min | ½ silica, Vulkanox, Protektor |
| 4 to 5 min | Mixing |
| 5 min | Aeration |
| 5 to 6 min | Mixing and discharge |
| Batch temp. | 145–155° C. |
| Storage | 24 h at room temperature |

Stage 2

Settings

| | |
|---|---|
| Mixing unit | As in stage 1 except for: |
| Speed | 70 min$^{-1}$ |
| Flow-through temp. | 70° C. |
| Degree of filling | 0.53 |

Mixing process

| | |
|---|---|
| 0 to 2 min | Break up batch stage 1 |
| 2 to 5 min | Maintain batch temperature of 150° C. by speed variation |
| 5 min | Discharge |
| Batch temp. | 145–155° C. |
| Storage | 4 h at room temperature |

Stage 3

Settings

| | |
|---|---|
| Mixing unit | As in stage 1, except for |
| Speed | 40 min$^{-1}$ |
| Degree of filling | 0.50 |
| Flow-through temp. | 50° C. |

Mixing process

| | |
|---|---|
| 0 to 2 min | Batch stage 2, accelerator, sulphur |
| 2 min | Discharge and form hide on the laboratory roll mill (diameter 200 nm, length 450 mm, flow-through temperature 50° C.) Homogenization: Cut in 3* left, 3* right and pull und umklappen sowie hide out 8* with roll nip (6 mm) and 3* with narrow roll nip (3 mm) sturzen |
| Batch temp. | <110° C. |

The methods for rubber testing are listed in table 3.

TABLE 3

| Physical test | Standard/conditions |
|---|---|
| ML 1 + 4, 100° C., 3rd stage | DIN 53523/3, ISO 667 |
| Vulcameter test, 165° C. Dmax – Dmin (dNm) | DIN 53529/3, ISO 6502 |
| Tensile test on the ring, 23° C. Tensile strength (MPa) Elongation at break(%) | DIN 53504, ISO 37 |
| Shore A hardness, 23° C. (SH) | DIN 53 505 |
| Ball Rebound, 60° C. (%) | ASTM D 5308 |
| Goodrich flexometer test, 0.250 inch stroke/25 min, 23° C. Contact temperature (° C.) Puncture temperature (° C.) Permanent Set (%), Shore A hardness, 23° C. (SH) | DIN 53533, ASTM D 623 A DIN 53 505 |
| Viscoelastisc properties, 60° C., 16 Hz, 50 N preliminary 25 N amplitude force force and loss factor tan δ (—) | DIN 53 513, ISO 2856 |

Table 4 shows the results of rubber testing. The mixtures are vulcanized for 25 min at 165° C.

TABLE 4

| Raw mixture data | Unit | Mixture 1 (comparative ex.) | Mixture 2 |
|---|---|---|---|
| ML 1 + 4, 3rd stage | [—] | 67 | 62 |
| Dmax – Dmin | [dNm] | 13.9 | 13.9 |

| Vulcanization data | Unit | Mixture 1 (Comparative ex.) | Mixture 2 |
|---|---|---|---|
| Tensile strength | [MPa] | 12.8 | 13.5 |
| Elongation at break | [%] | 310 | 340 |
| Shore A hardness | [—] | 57 | 56 |
| Ball rebound | [%] | 71.0 | 71.1 |
| Contact temperature | [° C.] | 52 | 50 |
| Puncture temperature | [° C.] | 92 | 89 |
| Permanent set | [%] | 2.4 | 2.0 |
| Tan δ | [—] | 0.068 | 0.068 |

As can be seen from the data in table 4, the rubber mixture 2 is distinguished by improved processing since the viscosity of the mixture is substantially lower. At the same time, however, the Dmax–Dmin is identical which shows that the crosslinking reaction is comparable.

In the area of the vulcanization data, the rubber mixture 2 is distinguished from the mixture 1 by improved tensile strength and a higher elongation at break. This is particularly advantageous tensile stress—strain behaviour. In the case of comparable hardness, mixture 2 also exhibits a smaller heat buildup and a lower permanent set, which is particularly advantageous for the life of dynamically deformed rubber mixtures, such as tyre treads or damping elements.

It can therefore be shown that, by using the described organosilicon compounds according to formula I in rubber mixtures, their processing can be improved and at the same time advantages in vulcanization properties can be achieved in comparison with mixtures of the prior art.

Another advantage is that less volatile constituents (VOC) can be liberated in the preparation of the rubber mixtures according to the invention.

Example 4

Preparation of HS—CH$_2$—CH$_2$—CH$_2$—Si(O—CH(CH$_3$)—CH$_2$)$_3$N

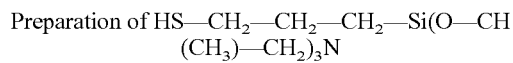

The HS—CH$_2$—CH$_2$—CH$_2$—Si(O—CH(CH$_3$)—CH$_2$)$_3$N is synthesized from 349 g of commercially available HS—CH$_2$—CH$_2$—CH$_2$—Si(O—CH$_2$—CH$_3$)$_3$ with 280 g of triisopropanolamine in the presence of 6 g of NaOH at 110-140° under reduced pressure by transesterification in the absence of a solvent. The ethanol formed is distilled off, and 425 g of a very viscous colourless oil is obtained.

Example 5

Rubber Technology Investigation

The mixtures are prepared according to the present formulation shown in table 1 and the mixing method of table 2. The metering of the compound is the same for the comparative example (mixture 3) as in example 3/mixture 1, i.e. 2.4 phr of 3-mercaptopropyltriethoxysilane. The compound of example 4 is metered in an equimolar amount relative thereto, i.e. with 2.93 phr (mixture 4). The rubber tests are investigated according to the test conditions from table 3. The results of the rubber tests are shown in table 5.

TABLE 5

| | Unit | Mixture 3 (comparative ex.) | Mixture 4 |
|---|---|---|---|
| Raw mixture data | | | |
| ML 1 + 4, 3rd stage | [—] | 66 | 59 |
| Dmax – Dmin | [dNm] | 15.2 | 15.9 |
| Vulcanization data | | | |
| Tensile strength | [MPa] | 14.3 | 14.3 |
| Elongation at break | [%] | 355 | 393 |
| Shore A hardness | [—] | 58 | 58 |
| Contact temperature | [° C.] | 58 | 57 |
| Puncture temperature | [° C.] | 107 | 104 |
| Permanent set | [%] | 2.9 | 3.1 |

As can be seen from the data in table 5, here too the rubber mixture with the silane according to the invention is distinguished by improved processing since the viscosity of the mixture is substantially lower.

An advantageous tensile stress-strain behaviour is likewise achieved here by the given higher elongation at break at constant tensile strength. Mixture 4 shows a lower heat buildup with constant hardness.

The processing of mixture 4 is therefore improved compared with mixture 3 and at the same time advantages in vulcanization properties are achieved.

Further, variations and modifications of the foregoing will be apparent to those skilled in the art and are intended to be encompassed by the claims appended hereto.

The benefit of German priority 1020050387794.2 filed Aug. 17, 2005 is claimed and incorporated herein by reference.

We claim:

1. A rubber mixture, comprising a blend of a styrene/butadiene copolymer and polybutadiene and at least one organosilicon compound of the formula (I)

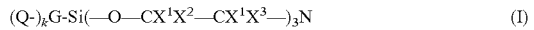

where Q is —SH,
k is 1,
G is $CH_2CH_2CH_2$, and
$X^1$, $X^2$ and $X^3$, in each case independently of one another, denote hydrogen (—H) or a straight-chain unsubstituted or branched unsubstituted ($C_1$-$C_{16}$)-alkyl or aryl group, and a filler, a nitrogen-containing activator, an antiozone wax, a vulcanization accelerator, or a combination thereof.

2. The rubber mixture of claim 1 which is vulcanizible.

3. The rubber mixture of claim 1 which is vulcanized.

4. The rubber mixture of claim 1 and further comprising an additional rubber which is a natural or synthetic rubber.

5. The rubber mixture according to claim 4, wherein the additional rubber is a diene rubber.

6. The rubber mixture according to claim 1 wherein the organosilicon compound is partly hydrolyzed.

7. A rubber moulding comprising the rubber mixture according to claim 1.

8. A vehicle tire tread made from the rubber mixture of claim 1.

9. A rubber vulcanizate made from the rubber mixture of claim 1 which is free of nitrogen containing activators.

10. A pneumatic tire, tire tread, rubber-containing tire component, cable sheath, hose, drive belt, conveyer belt, roll covering, tire, shoe sole, gasket, or damping element made from the rubber mixture of claim 1.

11. A process for the preparation of the rubber mixture according to claim 1, comprising mixing together a blend of a styrene/butadiene copolymer and polybutadiene and an organosilicon compound of the formula (I).

12. The rubber mixture according to claim 1, wherein an organosilicon compound according to formula I is applied to or mixed with an inert organic or inorganic substrate or is pre-reacted with an organic or inorganic substrate.

13. An organic or inorganic substrate having reacted therewith the organosilicon compound of formula I $$(Q\text{-})_k G\text{-Si}(-O-CX^1X^2-CX^1X^3-)_3N \qquad (I)$$

where Q is —SH,
k is 1,
G is $CH_2CH_2CH_2$, and
$X^1$, $X^2$ and $X^3$, in each case independently of one another, denote hydrogen (—H) or a straight-chain unsubstituted or branched unsubstituted ($C_1$-$C_{16}$)-alkyl or aryl group, and
a filler, a nitrogen-containing activator, an antiozone wax, a vulcanization accelerator, or combination thereof.

14. A rubber mixture, comprising a blend of a styrene/butadiene copolymer and polybutadiene, and at least one organosilicon compound having the following formula

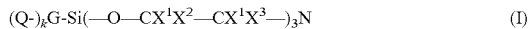

wherein (($C_1$-$C_8$)-alkyl) is a straight-chain or branched alkyl group.

15. The rubber mixture of claim 14, wherein the at least one organosilicon compound is HS—$CH_2$—$CH_2$—$CH_2$—Si(—O—$CH_2$—$CH_2$)$_3$N.

* * * * *